United States Patent
Langos et al.

(10) Patent No.: US 9,774,744 B2
(45) Date of Patent: *Sep. 26, 2017

(54) SYSTEMS AND METHODS FOR INTEGRATING INFORMATION FROM VOICE OVER INTERNET PROTOCOL SYSTEMS AND SOCIAL NETWORKING SYSTEMS

(75) Inventors: Geoffrey Langos, Manalapan, NJ (US); Tzahi Efrati, Givataim (IL); Baruch Sterman, Efrat (IL)

(73) Assignee: VONAGE AMERICA INC., Holmdel, NJ (US)

( * ) Notice: Subject to any disclaimer, the term of this patent is extended or adjusted under 35 U.S.C. 154(b) by 1129 days.

This patent is subject to a terminal disclaimer.

(21) Appl. No.: 13/241,792

(22) Filed: Sep. 23, 2011

(65) Prior Publication Data

US 2012/0099483 A1    Apr. 26, 2012

Related U.S. Application Data

(60) Provisional application No. 61/406,729, filed on Oct. 26, 2010.

(51) Int. Cl.
*H04M 7/00* (2006.01)
*H04M 3/22* (2006.01)
(Continued)

(52) U.S. Cl.
CPC ...... *H04M 7/0024* (2013.01); *G06Q 30/0255* (2013.01); *G06Q 50/01* (2013.01);
(Continued)

(58) Field of Classification Search
CPC ..... H04L 63/14; H04L 47/283; H04L 67/327; H04L 45/54; H04L 45/745; H04L 12/741; H04L 12/743; H04N 21/23106
See application file for complete search history.

(56) References Cited

U.S. PATENT DOCUMENTS 7,336,672 B1 *   2/2008   Aweya ................... H04L 47/10
                                                    370/412
8,121,264 B1 *   2/2012   Hogg et al. ............... 379/88.22
(Continued)

FOREIGN PATENT DOCUMENTS

GB   WO 2009045899 A2 *  4/2009  ............ G06Q 30/02
WO      2009/045899          4/2009
(Continued)

OTHER PUBLICATIONS

Lei, M.I.; Chan, S.-H.G.; Wong, A.K.-S., "Efficient person searching in a peer-to-peer network" Global Telecommunications Conference, 2005. GLOBECOM '05. IEEE ,vol. 2 ,Digital Object Identifier: 10.1109/GLOCOM.2005.1577781 Publication Year: 2005.*
(Continued)

*Primary Examiner* — Andrew Lai
*Assistant Examiner* — Hoyet H Andrews, III
(74) *Attorney, Agent, or Firm* — Nixon & Vanderhye P.C.; Joseph Pagnotta

(57) ABSTRACT

Systems and methods of recommending that two people form a link on a social networking system uses activities conducted by a first person on a telephony system to determine the names of individuals and businesses that the first person has communicated with through the telephony system. This list of names and individuals is then compared to the names of individuals and businesses that are members of the social networking system. If the first person is communicating with individuals or businesses who are members of the social networking system, a recommendation that they form a link on the social networking system is issued to one or both parties.

17 Claims, 15 Drawing Sheets

(51) Int. Cl.
*H04M 3/487* (2006.01)
*H04W 4/20* (2009.01)
*G06Q 50/00* (2012.01)
*G06Q 30/02* (2012.01)

(52) U.S. Cl.
CPC ....... *H04M 3/2218* (2013.01); *H04M 3/4878* (2013.01); *H04W 4/206* (2013.01); *H04M 2201/18* (2013.01); *H04M 2203/353* (2013.01); *H04M 2203/551* (2013.01); *H04M 2203/555* (2013.01); *H04M 2203/655* (2013.01)

(56) References Cited

U.S. PATENT DOCUMENTS

| | | | |
|---|---|---|---|
| 8,537,984 | B2* | 9/2013 | Barker et al. ............... 379/88.17 |
| 2002/0124096 | A1* | 9/2002 | Loguinov ............ H04L 1/0001 709/230 |
| 2002/0194361 | A1* | 12/2002 | Itoh ...................... H04L 1/0002 709/233 |
| 2003/0133443 | A1* | 7/2003 | Klinker ............... H04L 12/2602 370/353 |
| 2004/0137945 | A1* | 7/2004 | Takagi et al. ................. 455/558 |
| 2005/0044270 | A1* | 2/2005 | Grove ............... H04L 29/12066 709/238 |
| 2005/0086104 | A1* | 4/2005 | McFadden ...................... 705/14 |
| 2005/0169199 | A1* | 8/2005 | Futenma ........... H04L 29/06027 370/282 |
| 2005/0198351 | A1* | 9/2005 | Nog ..................... H04L 45/306 709/232 |
| 2006/0092840 | A1* | 5/2006 | Kwan .................... H04L 47/10 370/230.1 |
| 2007/0239892 | A1* | 10/2007 | Ott .......................... H04L 29/06 709/242 |
| 2009/0092124 | A1* | 4/2009 | Singhal ................ H04L 67/104 370/351 |
| 2009/0138968 | A1* | 5/2009 | Serber ..................... H04L 63/14 726/22 |
| 2009/0172191 | A1* | 7/2009 | Dumitriu ............ H04L 67/1029 709/241 |
| 2009/0203391 | A1 | 8/2009 | Mazor et al. |
| 2009/0235335 | A1* | 9/2009 | Mendiola .......................... 726/4 |
| 2010/0067393 | A1* | 3/2010 | Sakimura ............ H04L 12/5695 370/252 |
| 2010/0077027 | A1* | 3/2010 | Chitturi et al. ................ 709/203 |
| 2010/0223335 | A1* | 9/2010 | Fu et al. ....................... 709/205 |
| 2011/0235786 | A1* | 9/2011 | Barker et al. .............. 379/88.17 |
| 2012/0329486 | A1* | 12/2012 | Gits et al. ..................... 455/466 |
| 2013/0031162 | A1* | 1/2013 | Willis et al. .................. 709/203 |
| 2013/0058274 | A1* | 3/2013 | Scherzer et al. .............. 370/328 |
| 2013/0080607 | A1* | 3/2013 | Raleigh ........................ 709/221 |
| 2013/0086642 | A1* | 4/2013 | Resch et al. ...................... 726/4 |
| 2013/0097312 | A1* | 4/2013 | Mazumdar et al. .......... 709/224 |

FOREIGN PATENT DOCUMENTS

| | | | |
|---|---|---|---|
| WO | WO 2009/045899 | * | 4/2009 |
| WO | WO 2009/045899 A2 | * | 4/2009 |
| WO | 2009/072741 | | 6/2009 |

OTHER PUBLICATIONS

Lei, M.I.; Chan, S.-H.G.; Wong, A.K.-S., "Efficient person searching in a peer-to-peer network," Global Telecommunications Conference, 2005. GLOBECOM '05. IEEE , vol. 2, No., pp. 5 pages,, Nov. 28-Dec. 2, 2005 doi: 10.1109/GLOCOM.2005.1577781.*

Lei, M.I.; Chan, S.-H.G.; Wong, A.K.-S., "Efficient person searching in a peer-to-peer network", Global Telecommunications Conference, 2005, GLOBECOM '05. IEEE, vol. 2, Digital Object Identifier: 10.1109/GLOCOM.2005.1577781 Publication Year: 2005.*

International Search Report issued in PCT/US2011/052868 on Jan. 12, 2012.

Written Opinion issued in PCT/US2011/052868 on Jan. 12, 2012.

Office Action dated Dec. 20, 2013, in Canadian patent application No. 2,771,081.

* cited by examiner

| IP TELEPHONY SYSTEM IDENTIFIER | NAME | HOME TELEPHONE NUMBER | MOBILE TELEPHONE NUMBER | E-MAIL ADDRESS | I.M. IDENTIFIER | ADDRESS |
|---|---|---|---|---|---|---|
| 1234567 | JOHN SMITH | 847 555 1212 | | JS1@aol.com | | 44 Maple Ln. Chicago, IL |
| 2345678 | JOHN DOE | | 617 567 8910 | JB@von.com | | |
| 3456789 | SUE JOHNSON | 312 333 1234 | | SJ@von.com | | |
| 4567890 | JOAN ANDERSON | | 312 222 1234 | JA@aol.com | | 41 Oak Ln. Chicago, IL |
| 5678901 | KATE JACKSON | | 808 215 5555 | | | |
| . . . . . . | . . . . . . | | | | | |

FIGURE 6

SYSTEMS AND METHODS FOR INTEGRATING INFORMATION FROM VOICE OVER INTERNET PROTOCOL SYSTEMS AND SOCIAL NETWORKING SYSTEMS

This application claims priority to the filing date of U.S. Provisional Patent Application Ser. No. 61/406,729, filed Oct. 26, 2010, the contents of which are incorporated herein by reference.

BACKGROUND OF THE TECHNOLOGY

The technology is related to Internet Protocol (IP) telephony systems which connect telephone calls to or from devices using data packet communications. In a typical IP telephony system, users can place and receive telephone calls using IP based telephones, computers running IP telephony software, or via a normal analog telephone which is connected to the Internet via a telephone adapter.

Each time that a customer of the IP telephony system places a call or receives a call through the IP telephony system, a call detail record (CDR) is established for the call. The CDR includes various items of information about the call. For instance, the information included in a CDR would typically include the telephone number of the calling party, the telephone number of the called party, the time the call was established, the time the call ended, as well as various other items of information relating to the elements of the IP telephony system that handled the call.

The technology is also related to social networking systems which allow members to easily interact with one another via the Internet. Typically, each member of a social networking system will establish a presence on the social networking system, which can include posting some basic information. Members then establish links to one another through the social networking system. Once a link is established between first and second members, the first member can easily see information posted by the second member, and vice versa.

Presently, there is no way for a social networking system to obtain and utilize the information in CDRs that are recorded by a IP telephony system in order to aid the social networking system in providing services to the members of the social networking system. Specifically, there is no way for a social networking system to utilize the information contained in CDRs to recommend that two unlinked members of a social networking system establish a link between themselves.

BRIEF DESCRIPTION OF THE DRAWINGS

FIG. 6 illustrated the structure of an embodiment of an ID cross-reference database;

DETAILED DESCRIPTION OF PREFERRED EMBODIMENTS

Figure 1:
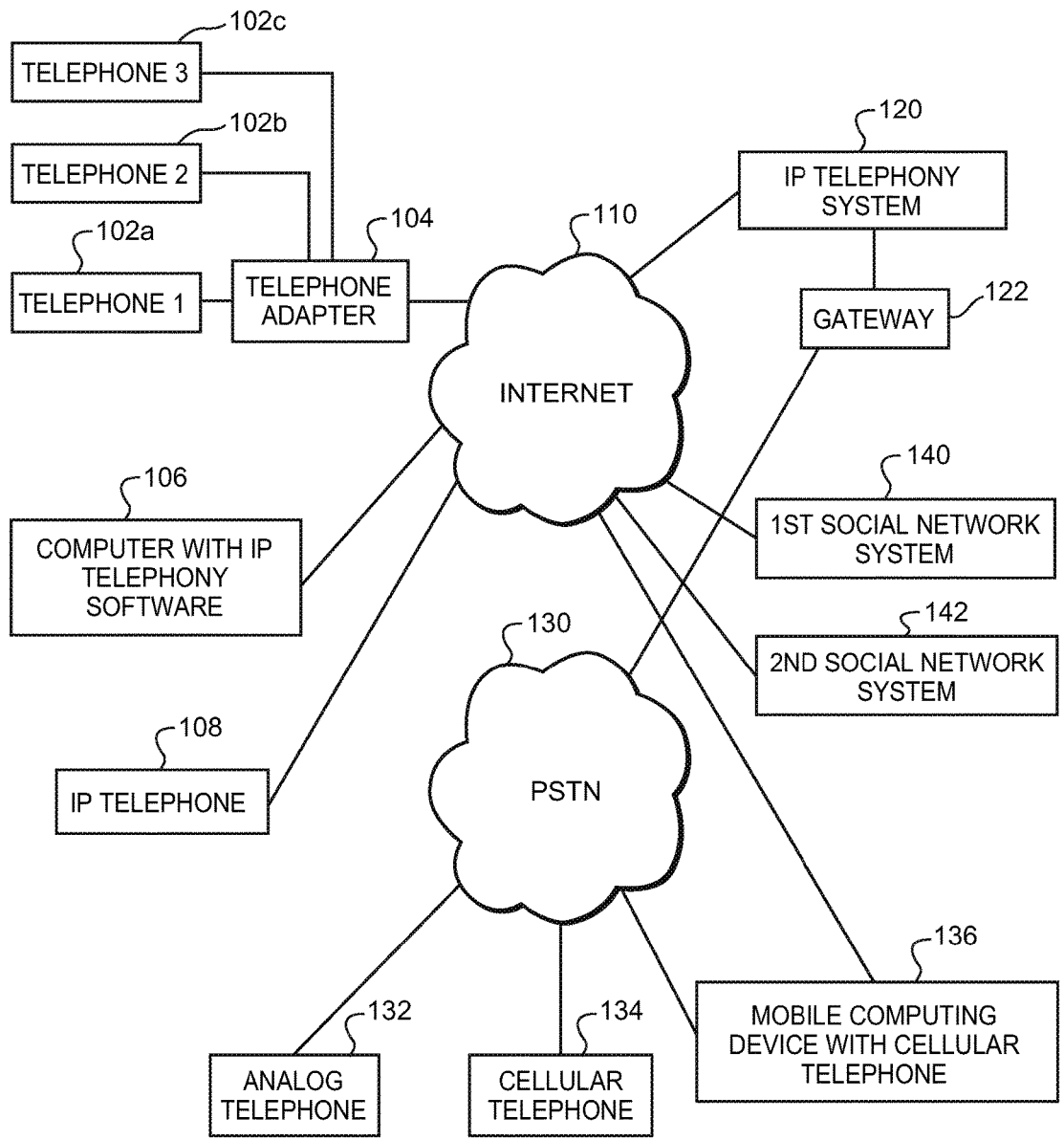
FIG. 1 is a diagram of various elements which may be associated with an IP telephony system, a typical public switched telephone network (PSTN) and one or more social networking systems.

FIG. 1 illustrates different elements which can be a part of an IP telephony system, a public switched telephone network (PSTN), a cellular telephone network, and one or more social networking systems.

As shown therein, an IP telephony system 120 enables connection of telephone calls between its own customers and other parties via data communications that pass over a data network. The IP telephony system might also deliver SMS or MMS messages to or from its customers, as well as deliver other forms of communications. As illustrated in FIG. 1, the data network is commonly the Internet. The IP telephony system 120 is connected to the Internet 110. In addition, the IP telephony system 120 is connected to a PSTN 130 via a gateway 122.

The gateway 122 allows users and devices that are connected to the PSTN to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone could be connected to an Internet service provider via a wired connection or via a wireless router. In some instances, the IP telephone 108 could utilize a cellular telephone system to access the Internet.

Alternatively, a customer could utilize a normal analog telephone 102a which is connected to the Internet 110 via a telephone adapter 104. The telephone adapter converts analog signals from the telephone into data signals that pass over the Internet 110, and vice versa. Also, as illustrated in FIG. 1, multiple analog telephone devices 102a, 102b and 102c could all be coupled to the same telephone adaptor 104. Analog telephone devices include but are not limited to standard telephones and document imaging devices such as facsimile machines. A configuration using a telephone adapter 104 is common where all of the analog telephone devices 102a, 102b and 102c are located in a residence or business, and all of the telephone devices are connected to the same telephone adapter. With this type of a configuration, all of the analog telephone devices 102a, 102b, 102c share the same telephone number assigned to the telephone adaptor 104. Other configurations are also possible where multiple communication lines (e.g., a second telephone number) are provisioned by the IP telephony system.

In addition, a customer could utilize a soft-phone client running on a computer 106 to place and receive IP based telephone calls, and to access other IP telephony systems. In some instances, the soft-phone client could be assigned its own telephone number. In other instances, the soft-phone client could be associated with a telephone number that is also assigned to an IP telephone 108, or to a telephone adaptor 104 that is connected to one or more analog telephones.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 would then route the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In addition, mobile computing devices which include cellular telephone capabilities could also be used to place telephone calls to customers of the IP telephony system. A mobile computing device 136 as illustrated in FIG. 1 might connect to the PSTN 130 using its cellular telephone capabilities. However, such devices might also have the ability to connect wirelessly via some other means. For instance, a mobile computing device 136 might communicate with a wireless data router to connect the mobile computing device 136 directly to a data network, such as the Internet 110. In this instance, communications between the mobile computing device 136 and other parties could be entirely carried by data communications which pass from the mobile computing device directly to a data network 110. Of course, alternate embodiments could utilize any other form of wireless communications path to enable communications.

Users of the IP telephony system 120 are able to access the service from virtually any location where they can connect to the Internet. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system.

Additional elements illustrated in FIG. 1 are introduced and discussed in greater detail below.

Figure 2:
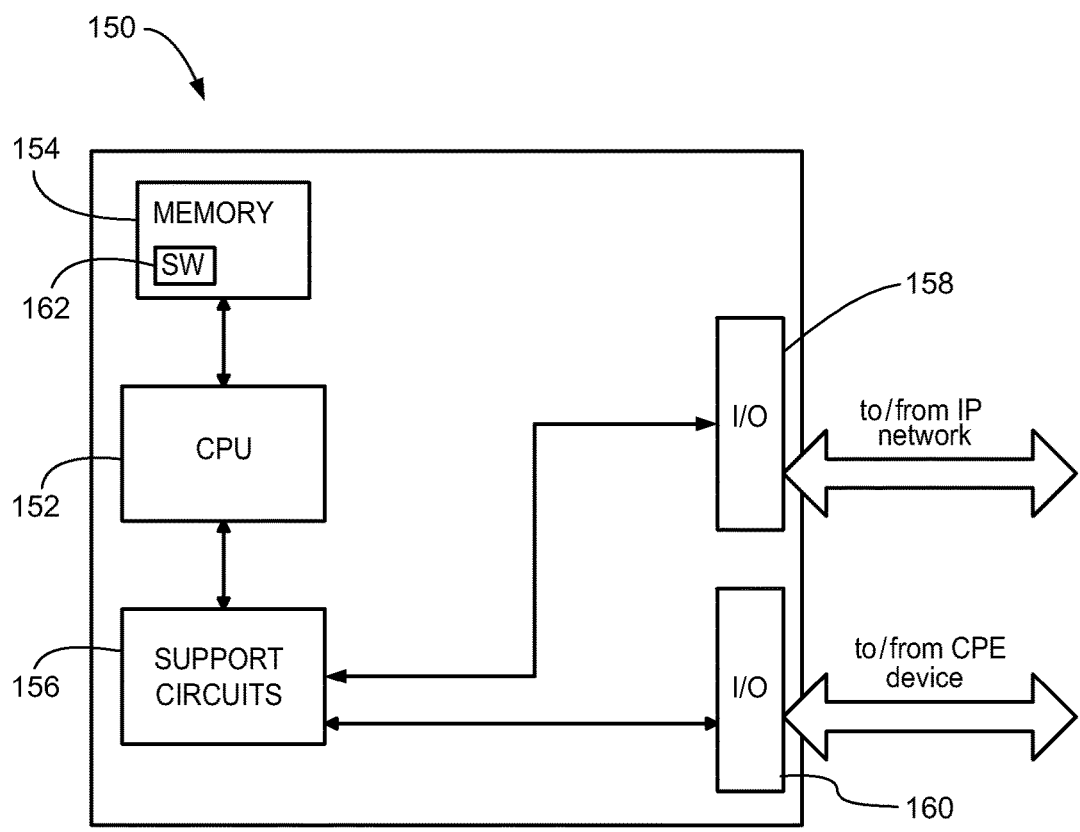
FIG. 2 is a diagram of various elements of a processor which can be part of an IP telephony system.

FIG. 2 illustrates elements of a computer processor that can be used as part of the IP telephony system 120 to accomplish various functions. The IP telephony system 120 could include multiple processors 150 located at various locations in the system, along with their operating components and programming, each carrying out a specific or dedicated portion of the functions performed by the VOIP based telephony service 120.

The processor 150 shown in FIG. 2 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to conduct a telephone call, to send or receive text messages, or to send and receive other forms of communications. An IP telephony device could be an IP telephone, a computer running IP telephony software, an IP telephony adapter which is itself connected to a normal analog telephone, or some other type of device capable of communicating via data packets. An IP telephony device could also be a cellular telephone or a portable computing device that runs a software client that enables the device to act as an IP telephone. Thus, a single device might be capable of operating as both a cellular telephone and an IP telephone.

Moreover, certain devices that are not traditionally used as IP telephony devices may act as IP telephony devices once they are configured with appropriate client software. Thus, some devices that would not normally be considered IP telephony devices may become IP once they are running appropriate software.

FIG. 1 also illustrates a first social networking system 140 and a second social networking system 142. Both social networking systems are connected to the Internet. As explained above, members of a social networking system are able to access the social networking system via the Internet. In some instances, access would be obtained using a computer. In other instances, a member might obtain access to the social networking system using a cellular telephone or a mobile computing device.

Members of a social networking system are able to post information, text, Internet links, and possibly photos, videos and other forms of media to the social networking system. Members of a social networking system are also able to selectively establish links between each other. Once a link has been established between first and second members, information posted by the first member can be accessed and viewed by the second member, and vice versa.

Some social networking systems also allow users to record their own contact information, and to make this information available to other members to whom they are linked. In fact, some social networking systems have as their primary purpose, a way for two people to easily exchange their respective contact information. In such systems, a first member could be linked to a large number of other members. If the first member needs to update an item of his own contact information due to a residential move, a professional move, or because of a change in a telephone number or e-mail address, the first member need only update his contact information posted on the social networking system. Once that change has been made, the changed information will become immediately available to the other members linked to the first member. Thus, the social networking system provides a simple and expedient way to make one's current contact information available to many other people.

Often, two people who are both members of a social networking system, and who are personally acquainted or may otherwise have common contacts, are not linked to one another simply because each person is unaware that the other person is also a member of the social networking system. In some instances, a first member of a social networking system might be aware that one of his friends is also a member of the same social networking system, but the first member may not be able to find the friend using a name or e-mail address for purposes of establishing a link. Systems and methods of determining whether to recommend that two people link to one another on a social networking system will now be described with reference to FIGS. 3-5.

Figure 3:
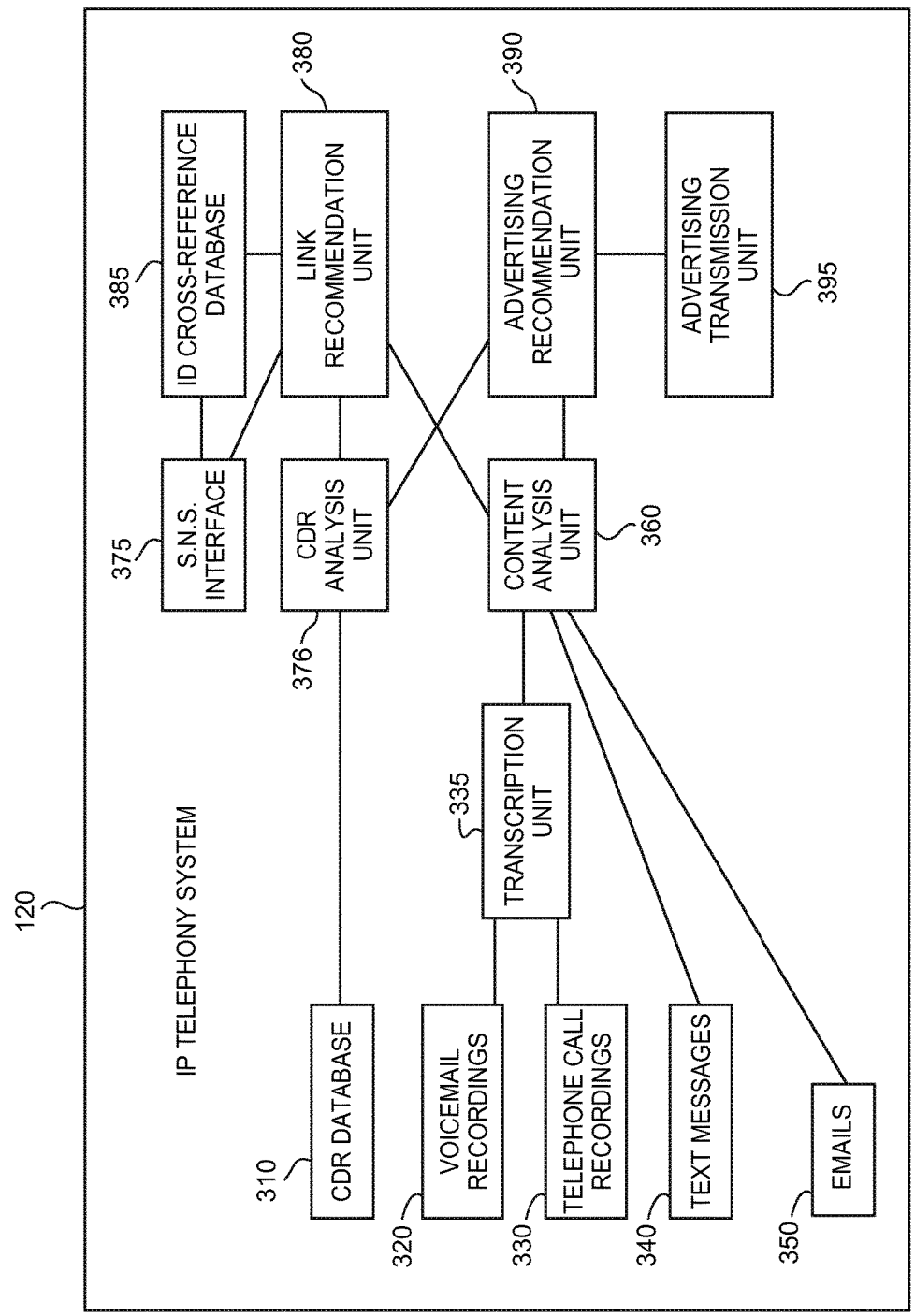
FIG. 3 is a block diagram illustrating selected elements of an IP telephony system.

FIG. 3 is a block diagram that presents some of the elements of an IP telephony system which is capable of determining when to recommend that two members of a social networking system establish a link on the social networking system.

The IP telephony system 120 includes a database 310 that includes information about calls, text messages and other forms of communications that have been placed through or completed through the IP telephony system. A CDR Analysis Unit 370 is coupled to the CDR database 310. The CDR Analysis Unit 370 is capable of analyzing the CDR data in various ways, as will be explained in more detail below. The CDR Analysis Unit 370 may also be linked to various other assets both inside and outside the IP telephony system. For example, the CDR Analysis Unit 370 may be linked to various databases of telephone numbers, various databases of businesses, and/or reverse telephone number databases that correlate telephone numbers to particular individuals or businesses.

The IP telephony system 120 also includes a voicemail recording storage unit 320. The voicemail recordings could be recordings of voicemail messages left for customers or users of the IP telephony system. In other instances, the voicemail recordings could be recordings that customers or users of the IP telephony system have left for people who obtain telephony services from some other service provider.

The IP telephony system 120 further includes a telephone call recording storage unit 330 that contains recordings of telephone calls placed over the IP telephony system. This could include recordings of outgoing telephone calls placed by customers of the IP telephony system, and recordings of incoming telephone calls placed to customers of the telephony system by non-customers.

A transcription unit 335 is coupled to the voicemail recording storage unit 320 and the telephone call recording storage unit 330. The transcription unit 335 utilizes speech recognition assets to generate transcriptions of the recorded voicemail messages and telephone calls.

The transcription unit 335 is coupled to a content analysis unit 360. The content analysis unit 360 may also be coupled to a text message storage unit 340 and an e-mail storage unit 350. The text messages stored in the text message storage unit 340 and the e-mails stored in the e-mail storage unit 350 could include both text messages and e-mails generated by the customers of the IP telephony system, as well as incoming text messages and e-mails that were generated by non-customers and that were sent to the customers of the IP telephony system. The content analysis unit 360 would analyze the content of the voicemail recordings, the telephone conversations, the text messages and the e-mails in various different ways as is explained in more detail below.

A social networking system interface 375 is used to access the information available to a customer on a social networking system. The capabilities and functions of the social networking system interface 375 are described in more detail below.

The IP telephony system 120 also includes an identifier cross-reference database 385. As described in more detail below, the identifier cross-reference database 385 cross-references different types of information used to identify individuals and businesses. For example, the identifier cross-reference database 385 could tie a telephone number for an individual to the e-mail address and instant messaging identifier for that individual. The identifier cross-reference database 385 can be loaded with information obtained from many different sources over an extended period of time, as explained in more detail below.

A Link Recommendation Unit 380 is coupled to the CDR Analysis Unit 370, the Content Analysis Unit 360, the social networking system interface 375 and the identifier cross-reference database 385. In addition, the Link Recommendation Unit 380 may also receive information from other assets both inside the IP telephony system 120 and outside the IP telephony system 120. For example, the Link Recommendation Unit 380 may interfacing with and obtain information from a social networking system, as is described in more detail below. Based on the information it obtains and analyses, the Link Recommendation Unit 380 generates recommendations that one member of a social networking system form a link with another member of the social networking system. Such recommendations could be sent to one of the two members, or to both of the members.

An Advertising Recommendation Unit 390 is also coupled to the CDR Analysis Unit 370 and the Content Analysis Unit 360. In addition, the Advertising Recommendation Unit 390 may receive information from other assets both inside the IP telephony system 120 and outside the IP telephony system 120. For example, the Advertising Recommendation Unit 390 may interface with and obtain information from various databases of telephone numbers, businesses and/or from reverse telephone number databases that correlate businesses to telephone numbers, as is described in more detail below. Based on the information it obtains and analyses, the Advertising Recommendation Unit 390 generates recommendations about whether, when and possibly how to send advertisements to individuals.

An Advertising Transmission Unit 395 is used to deliver advertising messages. The Advertising Transmission Unit 395 may receive instructions regarding the delivery of advertising messages from the Advertising Recommendation Unit 390. The Advertising Transmission Unit 395 delivers advertising messages to individuals in any of multiple different ways, as is discussed in more detail below.

Figure 4:
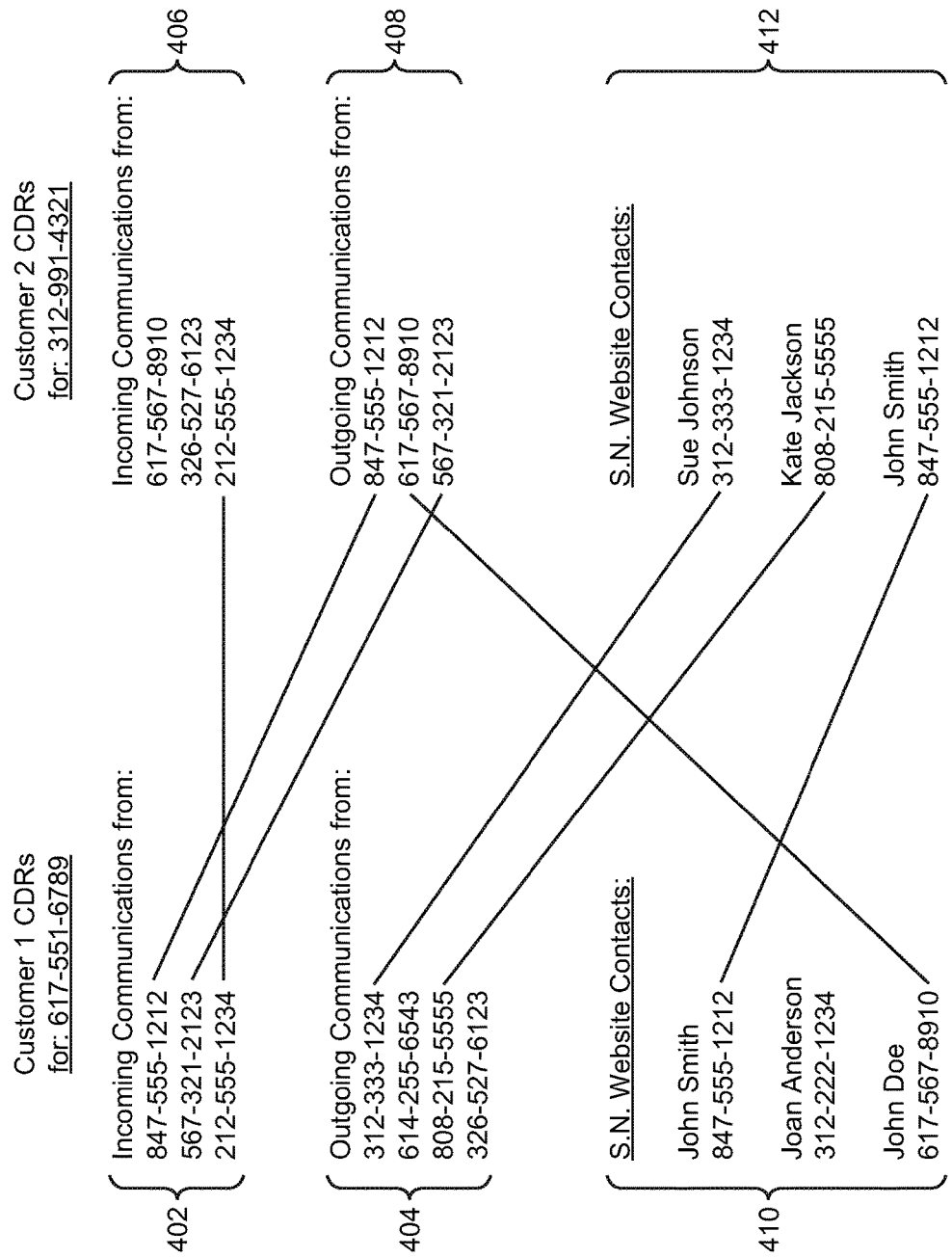
FIG. 4 is a diagram illustrating how information obtained from call detail records and social networking systems can be correlated.

FIG. 4 illustrates CDR data for two customers of an IP telephony system 120. Customer 1 has a telephone number of 617-551-6789. Customer 2 has a telephone number of 312-991-4321. As explained above, each time that a customer of an IP telephony system places a call to another party, or receives a call from another party, information about the call is recorded in call detail records. Similarly, when a customer sends or receives a text message or some other form of communication, information about the communication is recorded. This can include the telephone number from which an incoming communication was received, or the telephone number to which an outgoing communication was sent.

Although FIG. 4 illustrates telephone numbers associated with incoming and outgoing communications, in some instances a communication received by a customer or sent by a customer of an IP telephony system may not be associated with a telephone number. Instead, some other identifier may be used to identify the party that sent an incoming communication to a customer or to whom a customer has sent an outgoing communication. Thus, the illustration of telephone numbers in FIG. 4 should in no way be considered limiting. The methods and systems described herein could utilize other types of identifiers to route communications to and from customers of the IP telephony system.

FIG. 4 shows the telephone numbers to which customer 1 has sent outgoing communications 404 and the telephone numbers associated with incoming communications 402 received by customer 1 over a certain period of time. This same type of information is also shown for customer 2 in call lists 408 and 406, respectively. Although only a few telephone numbers are illustrated in FIG. 4, one of skill in the art would appreciate that a much larger number of calls might be placed by some individuals over a given period of time.

FIG. 4 also illustrates that customer 1 and customer 2 are both members of a social networking system. Some of the contact information of people to whom they are linked through the social networking system is also shown for each of customer 1 and customer 2 in contact lists 410 and 412. One of skill in the art would also appreciate that each customer may be linked to a much larger number of other members. The three contacts/links shown for each of customer 1 and customer 2 are only for illustrative purposes.

It is possible for the customers of an IP telephony system 120 to provide the IP telephony system with credentials that allow the IP telephony system 120 to access the information available to the customer on a social networking system. Once the IP telephony system has a customer's credentials, the IP telephony system can access the same information stored on the social networking system that would be directly available to the customer. Thus, an IP telephony system 120 could access the contact information available to the customer.

The social networking system interface 375 of the IP telephony system 120 uses a customer's credentials to access various social networking systems for purposes of accessing the information available to the customer on the social networking system. The customer's credentials might be stored in the social networking system interface 375, or at other locations.

Once the social networking system interface 375 has accessed a social networking system using a customer's credentials, the social networking system interface 375 is able to review the customer's contact or link information. Such information can provide the names, e-mail addresses, telephone numbers and other items of data that can be used to uniquely identify an individual or a business.

Figure 5:
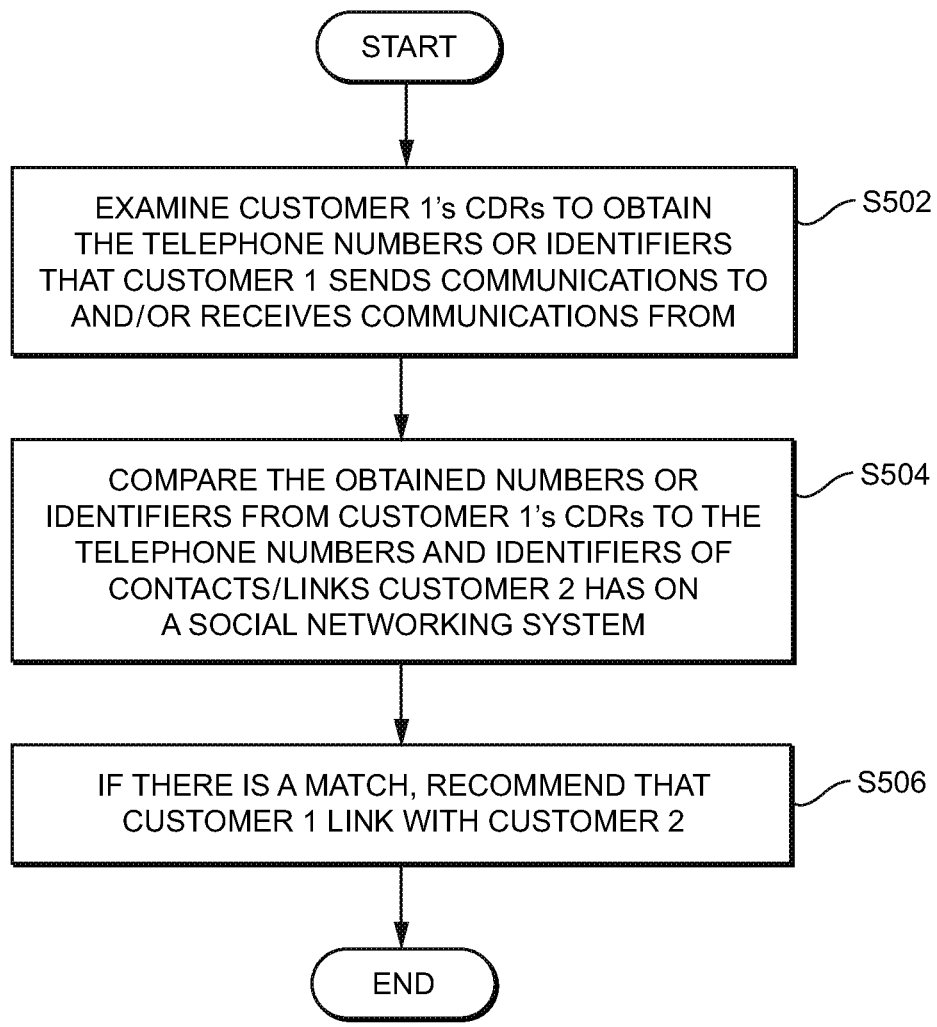
FIG. 5 is a diagram illustrating steps of a first method of determining when to recommend that two people establish a link on a social networking system.

Because the IP telephony system also has access to the information stored on CDRs for its customers, it is possible for the IP telephony system to use both pieces of information together to determine if it makes sense to recommend that one of its customers establish a link to another party on the social networking system. A method of doing so is illustrated in FIG. 5.

In step S502, the IP telephony system first examines customer 1's CDRs to determine the telephone numbers or identifiers to which customer 1 has sent communications, and from which customer 1 has received communications. This might include reviewing CDRs for customer 1 that have accumulated over a week, a month, or for longer periods of time.

In step S504, the social networking system interface 375 of the IP telephony system 120 uses previously obtained credentials from customer 2 to access customer 2's contact information within a social networking system. Typically, the contact information is for the members of the social networking system to whom customer 2 is linked on the social networking system. The IP telephony system 120 compares the telephone numbers or other identifiers obtained from customer 1's CDRs in lists 402 and 404 to the telephone numbers or other identifiers that are part of customer 2's contact information 412 on the social networking system.

If there is a match, that means customer 1 is communicating with someone to whom customer 2 is linked on the social networking system. In the data illustrated in FIG. 3, one can see that the CDR data for customer 1 indicates that customer 1 sent a communication to telephone number 312-333-1234, which is the telephone number for Sue Johnson, one of the people to whom customer 2 is linked on the social networking system. Likewise, customer 1 has also sent a communication to telephone number 808-215-5555, which is the telephone number for Kate Jackson, another of the people to whom customer 2 is linked on the social networking system.

Given those connections, in step S506 the system would issue a recommendation that customer 1 establish a link on the social networking system to customer 2, and/or vice versa. The recommendation to create a link on the social networking system could be delivered to one or both of the customers via the IP telephony system 120 or via the social networking system.

The fact that the IP telephony system is able to access both its customers' CDR data, as well as its customers' contact or link information on a social networking system makes it possible for the IP telephony system to identify connections between members of the social networking system that could not be identified by the information present only within the social networking system alone. Increasing the number of links between its members is one way for a social networking system to increase its utility to its members. Thus, recommending links in this fashion should be desirable to both the customers, and to the operators of the social networking system.

In the method described above, telephone numbers and/or other identifiers from one customer's CDR data are compared to the contact information stored for a second customer on a single social networking system. One of skill in the art will appreciate that the telephone numbers and/or identifiers obtained from customer 1's CDR data could be compared to the contact information for a large number of members of the social networking system. Likewise, one of skill in the art will appreciate that the telephone numbers and/or identifiers obtained from customer 1's CDRs could also be compared to the contact data for a large number of members of other social networking systems.

Information about customer 2's contacts that were obtained when the social networking system interface 375 accessed the social networking system with customer 2's credentials can be stored in the identifier cross-reference database 385 of the IP telephony system 120. An illustration of an embodiment of a data structure of such an identifier cross-reference database 385 is provided in FIG. 6.

As shown in FIG. 6, the IP telephony system 120 can assign a unique identifier to each individual or business that is entered into the database. Each unique identifier is then matched to other identifiers for individuals or businesses, such as a name, various telephone numbers, e-mail addresses, instant messaging identifiers, addresses information, and other identifiers.

The identifier cross-reference database 385 can be built up over time as the IP telephony system acquires information from a variety of different sources. For example, the IP telephony system 120 could begin creating an identifier cross-reference database 385 with the information it possess for its own customers. The IP telephony system could access contact lists or address books that it maintains for its own customers, and this information could be used to begin building the identifier cross-reference database 385. Each time a new individual or business is identified, a new entry for that individual or business would be created in the identifier cross-reference database 385. As much information as possible will then be entered into the identifier cross-reference database 385 from the information available in the customers' contact lists and address books.

If the social networking system interface 375 of the IP telephony system 120 obtains credentials from a first social networking system for one of its customers, the social networking system interface 375 will access the customer's contact/link information available on the first social networking system. If the social networking system interface 375 discovers a listing for a new individual or business in the customer's contact/link lists on the social networking system that is not already present in the identifier cross-reference database 385, a new listing for that individual or business will be created in the identifier cross-reference database 385, and all available information will be copied into the identifier cross-reference database 385. If one of the entries in the customer's contact/link list on the social networking system corresponds to a pre-existing entry in the identifier cross-reference database 385, the social networking system interface 375 may be able to add new items of identifier information to the ID cross-reference database 385 for that pre-existing entry. For example, if a first social networking system has assigned its own unique identifier to an individual, that information could be added to the ID cross-reference database 385.

If the social networking system interface 375 of the IP telephony system 120 obtains the credentials for the same customer on a second social networking system, the social networking system interface 375 will access the customer's contact/link information available on second social networking system and try to add yet additional information to the identifier cross-reference database.

In some instances, identifier information obtained for an individual/business from the contact/link information available on a first social networking system may prove valuable in obtaining additional identifier information for that individual/business from a second social networking system. For example, assume that before any reviews of social networking system data are performed, an individual's listing in the identifier cross-reference database 385 only includes the individual's name and a mobile telephone number. Assume that during a review of a customer's contact/link information on a first social networking system, the IP telephony system 120 is able to identify the individual's entry on the contact/link list in the first social networking system based on the mobile telephone number present in the identifer cross-reference database 385. Assume also that the contact/link information on the first social networking system includes the individual's e-mail address. This would allow the IP telephony system to add the individual's e-mail address to the ID cross-reference database 385.

Assume further that the same individual is listed in the customer's contact/link information on a second social networking system. But the contact/link entry in the second social networking system includes only an e-mail address and an instant messaging identifier.

If the IP telephony system uses the customer's credentials to access and review the customer's contact/link information on the second social networking system, the newly added e-mail address in the identifier cross-reference table 385 can be used to identify the individual's entry in the contact/link list on the second social networking system. And once the individual's entry has been identified, the IP telephony system 120 will be able to further add the individual's instant messaging identifier to the identifier cross-reference database 385.

If the individual's e-mail address had not first been obtained from a review of the contact/link information on the first social networking system, the IP telephony system 120 would not have been able to identify the individual's entry in the second social networking system. And this would have prevented the IP telephony system 120 from obtaining the individual instant messaging identifier and adding the instant messaging identifier to the identifier cross-reference database 385. Thus, maintaining the identifier cross-reference database 385, and updating the information stored in the identifier cross-reference database 385 each time that new information becomes available helps the IP telephony system to create a comprehensive listing of all identifiers that can be used identify an individual or a business. And correctly identifying an individual/business allows the IP telephony system to recommend links within a social networking system, as well as recommend the delivery of advertising messages, as discussed below.

Figure 7A:
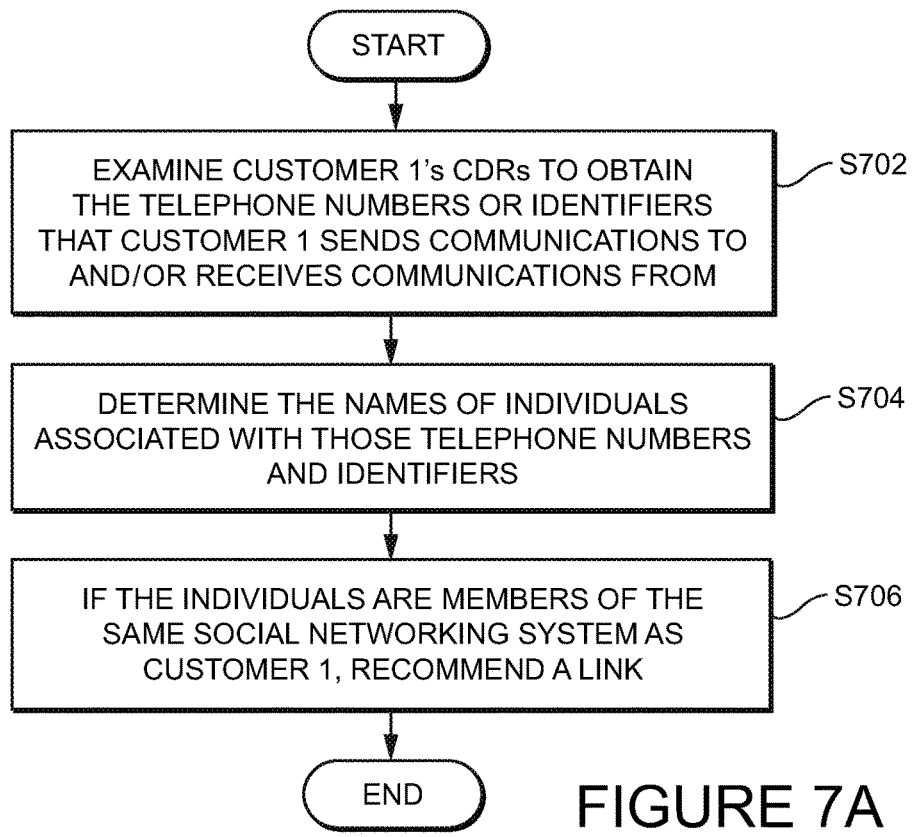
FIG. 7A is a diagram of a second method of determining when to recommend that one person establish a link on a social networking system with a second person.

Steps of another method of determining when to recommend a link on a social networking system with a customer of an IP telephony system is illustrated in FIG. 7A. As shown therein, in step S702, the CDRs that are created for a first customer within an IP telephony system are analyzed to determine the telephone numbers or identifiers that the first customer sends communications to and/or receives communications from. Next, the names of individuals and/or businesses associated with those telephone numbers and identifiers are determined in step S704. This could be accomplished by using internal or external databases that correlate telephone numbers or other identifiers to individuals and/or businesses.

In step S706, the names of those individuals/businesses, and possibly also their associated telephone numbers or other identifiers, are used to determine if the individuals/businesses are members of the same social networking system as the first customer. If so, the IP telephony system issues a recommendation for a link. This could include recommending that the first customer establish a link to another person or business who is a member of the social networking system, or recommending that an individual or business establish a link to the first customer. Of course, this could also include issuing recommendations for forming a link to both parties.

Figure 7B:
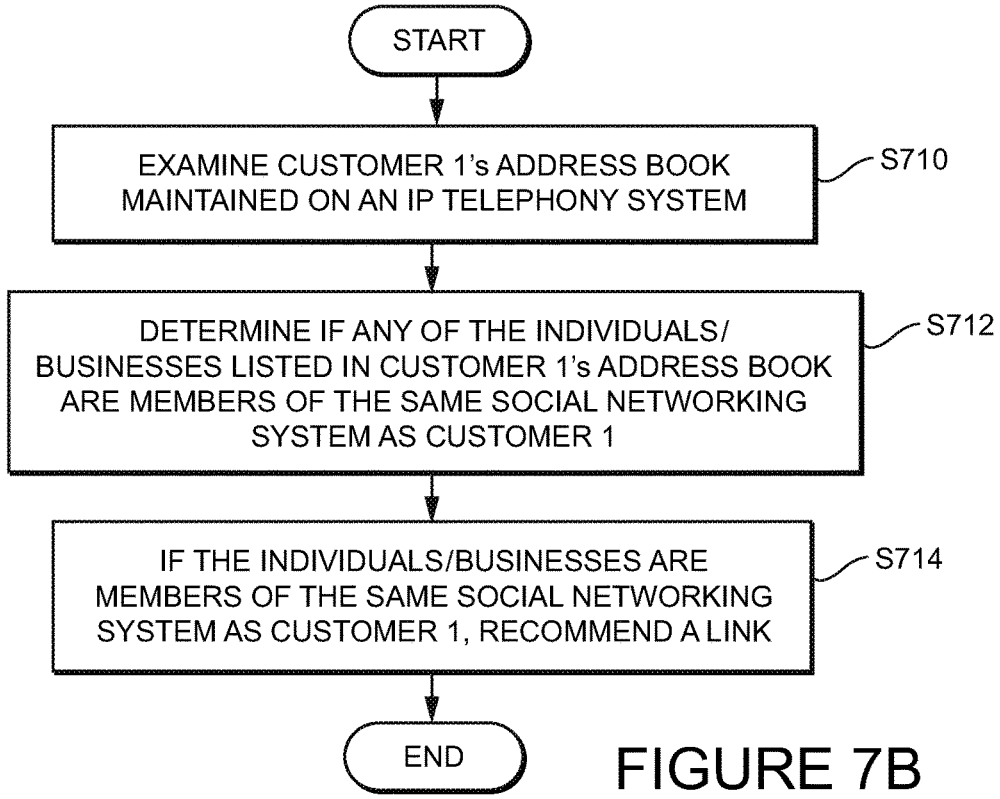
FIG. 7B is a diagram of a third method of determining when to recommend that one person establish a link on a social networking system.

A method similar to the one discussed above could also be performed using transcriptions of recordings of telephone conversations or voicemail messages for the first customer. In this alternate method, names and telephone numbers would be extracted from transcriptions of telephone conversations, voicemail recordings and possibly also text messages and e-mail messages. Those names and telephone numbers would then be used to determine if any of the individuals with whom the first customer has been communicating are members of the same social networking system as the first customer. If so, a recommendation to form a link is sent to the first customer and/or to the other identified individual FIG. 7B illustrates another method of determining when to recommend a link on a social networking system. As shown therein, in step S710, an address book maintained for a first customer is examined to obtain names, telephone numbers and other identifiers for the people and businesses listed in the first customer's address book. If an entry in the customer's address book contains a telephone number or another identifier, but not a name, internal or external databases that correlate telephone numbers or identifiers to individuals and businesses could be used to obtain names associated with the telephone numbers and identifiers.

In step S712, the names of those individuals and businesses, and possibly also their associated telephone numbers or identifiers, are used to determine if the individuals/businesses are members of the same social networking system as the first customer. If so, then in step S714 a recommendation to form a link on the social networking system is issued to the first customer and/or to the identified individual/business.

Figure 8:
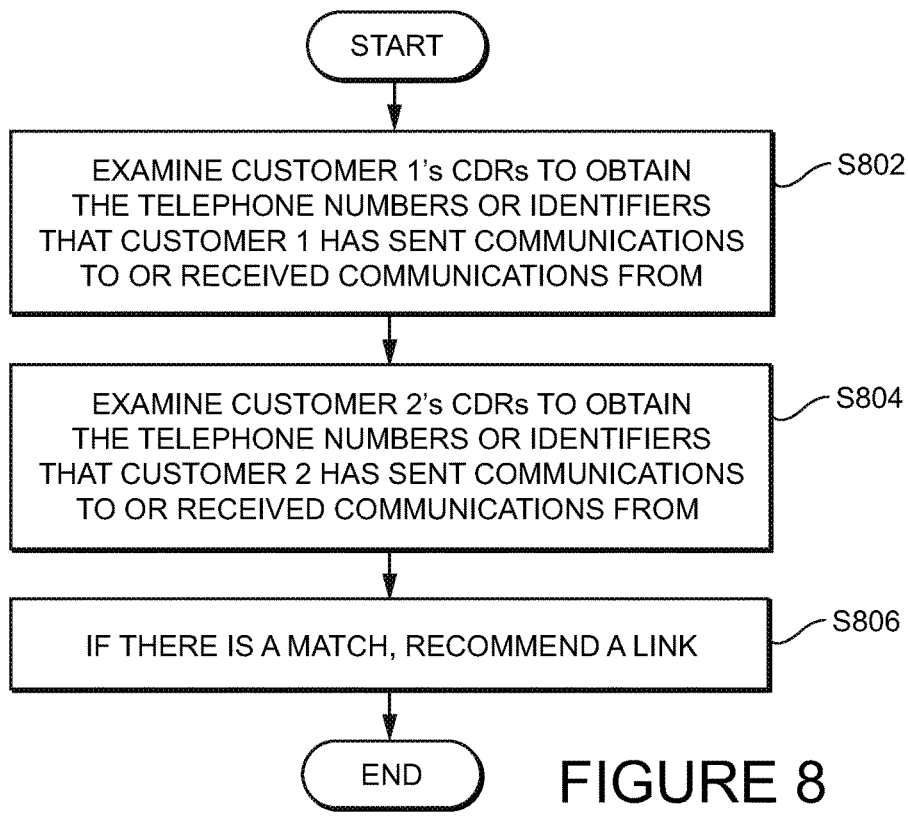
FIG. 8 is a diagram illustrating steps of a fourth method of determining when to recommend that two people establish a link on a social networking system.

Another method of determining when to recommend a link on a social networking system is illustrated in FIG. 8. As shown therein, in step S802, the IP telephony system 120 examines a first customer's CDRs to determine the telephone numbers or identifiers to which the first customer has sent communications, and from which the first customer has received communications. In step S804, the IP telephony system 120 does the same thing for a second customer. In step S806, if there is a match between the telephone numbers or identifiers acquired from the first customer's CDRs and the telephone numbers or identifiers acquired from the second customer's CDRs, then the IP telephony system recommends a link on the social networking system. This could include sending a link recommendation to one or both of the first and second customers.

Examples of data patterns which would lead to such link recommendations are illustrated in FIG. 4, which shows that both customer 1 and customer 2 have received communications from telephone number 212-555-1234. Thus, one can assume that customer 1 and customer 2 are both acquainted with the same individual/business. Likewise, FIG. 4 shows that customer 1 has received communications from telephone numbers 847-555-1212 and 567-321-2123, which are the same telephone numbers to which customer 2 has sent communications. If any of these matches were noted in step S606, the system would recommend that customer 1 and customer 2 establish a link on a social networking system where they are both members. Here again, because the social networking system itself does not have access to the CDR data stored on the IP telephony system, there would be no way for the social networking system to use similar information to make the recommendation for a link between two of its members.

Figure 9:
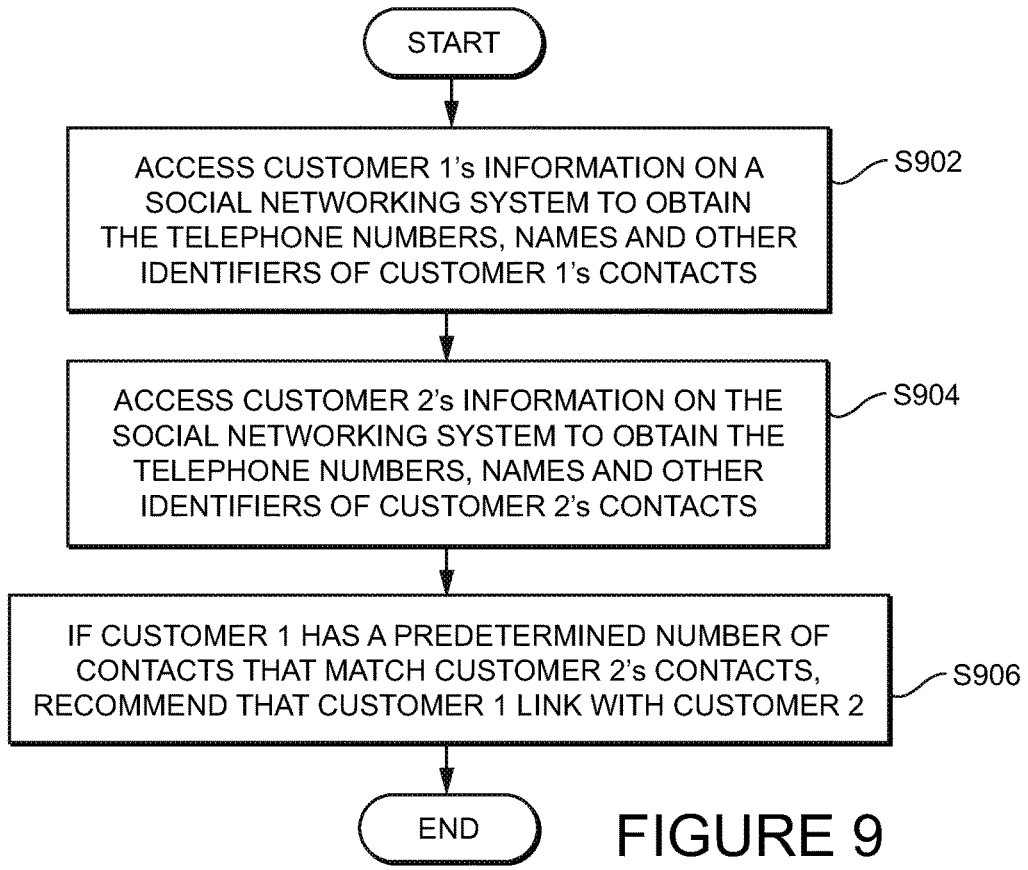
FIG. 9 is a diagram illustrating steps of a fifth method of determining when to recommend that two people establish a link on a social networking system.

FIG. 9 illustrates another method of determining when to recommend that two people establish a link on a social networking system. In this method, in step S902, the IP telephony system 120 utilizes previously obtained credentials to access and review the contact or link information for a first customer that is stored on a social networking system. The IP telephony system identifies the telephone numbers, names and other identifiers associated with the individuals and businesses in the first customer's contact/links information.

In step S904, the IP telephony system 120 does the same thing for a second one of its customers. In step S906, the IP telephony system compares the obtained telephone numbers, names and other identifiers, to determine if there are any matches. If so, the IP telephony system recommends that a link be established on the social networking system between the first and second customers. Such a link recommendation could be sent to one or both of the customers.

Examples of data patterns which would lead to such link recommendations are also shown in FIG. 4, which illustrates that customer 1's contact or link information on the social networking system includes John Smith, who has a telephone number of 847-555-1212. Customer 2's contact or link information on the social networking system lists the same person. And if both customer 1 and customer 2 have linked to the same person, the IP telephony system recommends that customer 1 and customer 2 establish a link on the social networking system. In some embodiments, the recommendation to form a link between two members of a social networking system might only be issued if the first and second customers have a minimum number of contacts or links in common.

Figure 10:
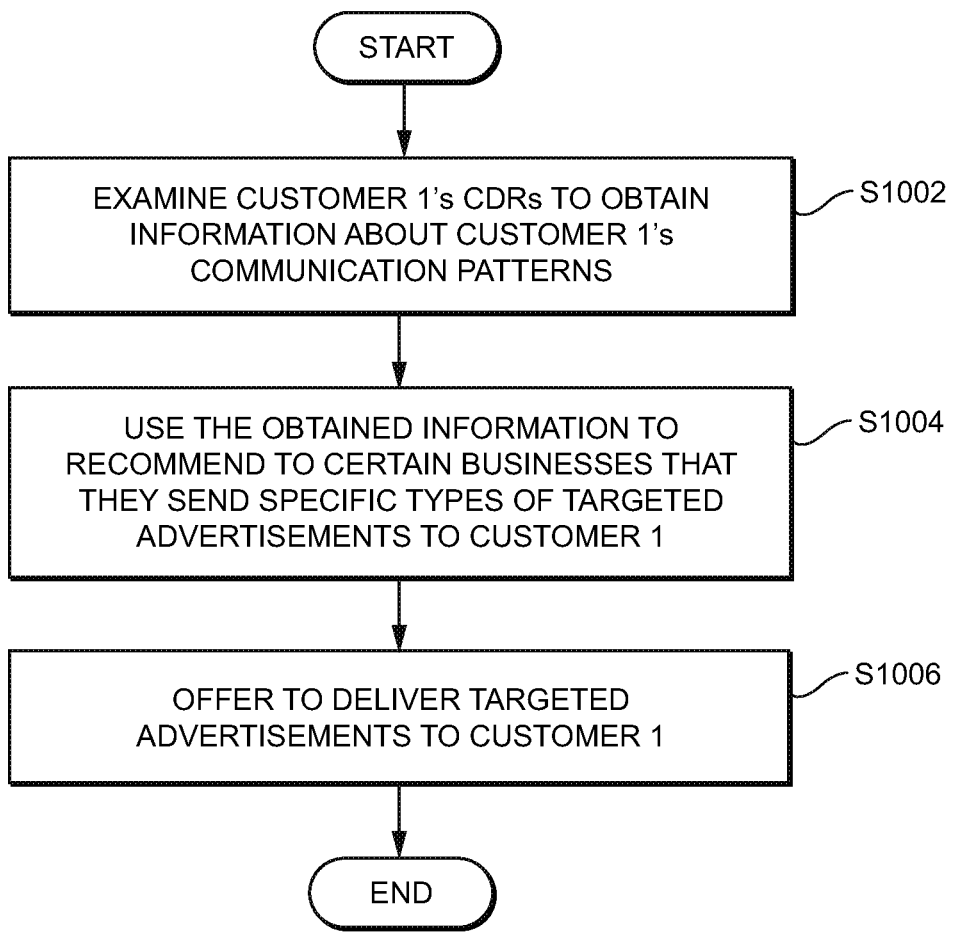
FIG. 10 is a diagram illustrating steps of a first method of determining when to recommend targeted advertising.

FIG. 10 illustrates steps of a method of using information obtained from customer CDRs to recommend or sell targeted advertisements to businesses. This method begins in step S1002, when the IP telephony system would review a customer's CDRs to note communications patterns. This step could take a number of different forms. A few examples are discussed below. However, the method would apply to virtually any type of analysis that renders useful data.

For example, the analysis could reveal that a customer calls a certain telephone number on a regular basis. The IP telephony system then consults one or more reverse telephone number databases to determine if the telephone number is for a business. If so, the IP telephony system determines the type of business. Once that pattern has been noted, in step S1004 the IP telephony system recommends to other competing businesses that an advertisement be sent to the customer.

In some instances, the databases consulted to identify the business connected with a telephone number called by the customer could be created and maintained by the IP telephony system itself. In other instances, the IP telephony system might consult databases maintained by a third party. Also, the IP telephony system might build its own databases over time by adding information to its own databases each time information is drawn from a third party database.

One example would be to note that a customer frequently places calls to a certain pizza business. Once the IP telephony system knows that the customer regularly orders pizza, the IP telephony system, in step S1004, could recommend to other competing pizza shops that an advertisement be sent to the customer. And because the IP telephony system is able to identify an individual who is known to purchase pizza on a regular basis, one would expect the competing pizza shops to pay a premium to obtain the customer's identity, or to have an advertisement delivered to the customer.

In step S1006, the IP telephony system itself could offer to deliver the advertisement to the customer. The advertisement could be delivered to the customer in the form of a SMS or MMS message, via e-mail, via a voice call from a live operator, by calling the customer and delivering a recorded message, or by calling the customer and connecting the customer to an interactive voice response system. In the case of an interactive voice response system, the customer could be presented with multiple options, with the ability to obtain various different items of information, or with the ability to obtain a discount coupon for the advertized service or product in any one of multiple different ways. In any event, if the IP telephony system itself becomes involved in delivery of the advertisement, it would provide another potential way for the IP telephony system to obtain revenue from the delivery of the advertisement. Also, if the advertisement were delivered in that fashion, it would be possible for the IP telephony system to never reveal the identity of the customer to which the advertisement is sent. And this could ally any fears that use of the customer's CDR data would lead to a breach of client confidentiality.

The IP telephony system 120 might also be able to obtain information about the customer's movements based on position data reported from GPS enabled telephones. If the customer's movements are also known, this information could be combined with information obtained from an analysis of the CDR data to even better identify those competing businesses who might be interested in sending an advertisement to the customer.

For example, and continuing with the pizza analogy given above, the analysis of the CDR data might indicate that the customer typically calls a pizza shop at about 6 pm each Friday. An analysis of the customer's movements might also reveal that the customer travels from his office to his residence at about the same time each Friday night by an identifiable path. Given this information, the IP telephony system could then search for competing pizza shops that are along the route traveled by the customer as he travels to his residence. If a competing pizza shop along that route is identified, the IP telephony system could recommend that the competing shop send the customer an advertisement. And this advertisement would be even more highly targeted because it would be from a shop along the customer's normal route home.

Taking this example one step further, the IP telephony system could offer to deliver an advertisement from the competing pizza shop to the customer, with the advertisement to be delivered to the customer at 5:30 pm on Friday evening, which is just before the customer typically places an order for a pizza. Thus, the timing of the delivery of advertising messages could also be controlled based on an analysis of the customer's CDR data.

In addition to analyzing CDR data to determine the businesses that a customer calls, the analysis could reveal the locations that are regularly called. For example, an analysis of a customer's CDR data could reveal that the customer regularly places calls to a particular foreign country. In this instance, the IP telephony system might recommend that a travel service that specializes in trips to that country send an advertisement to the customer.

An analysis of a customer's CDR data might be used by the IP telephony system itself to recommend an alternate calling plan that would result in better or less expensive service for the customer.

As noted above, the analysis of CDR data can take many forms. However, the analysis would be designed to identify information about the customer, his habits, his spending patterns, and his affiliations. As also noted above, the timing of the customer's communications may provide important clues about the customer's behavior patterns. Further, it may be possible to tie together both information from an analysis of a customer's CDRs, and his movement patterns. All of this information would be used to target advertisements to the customer.

Figure 11:
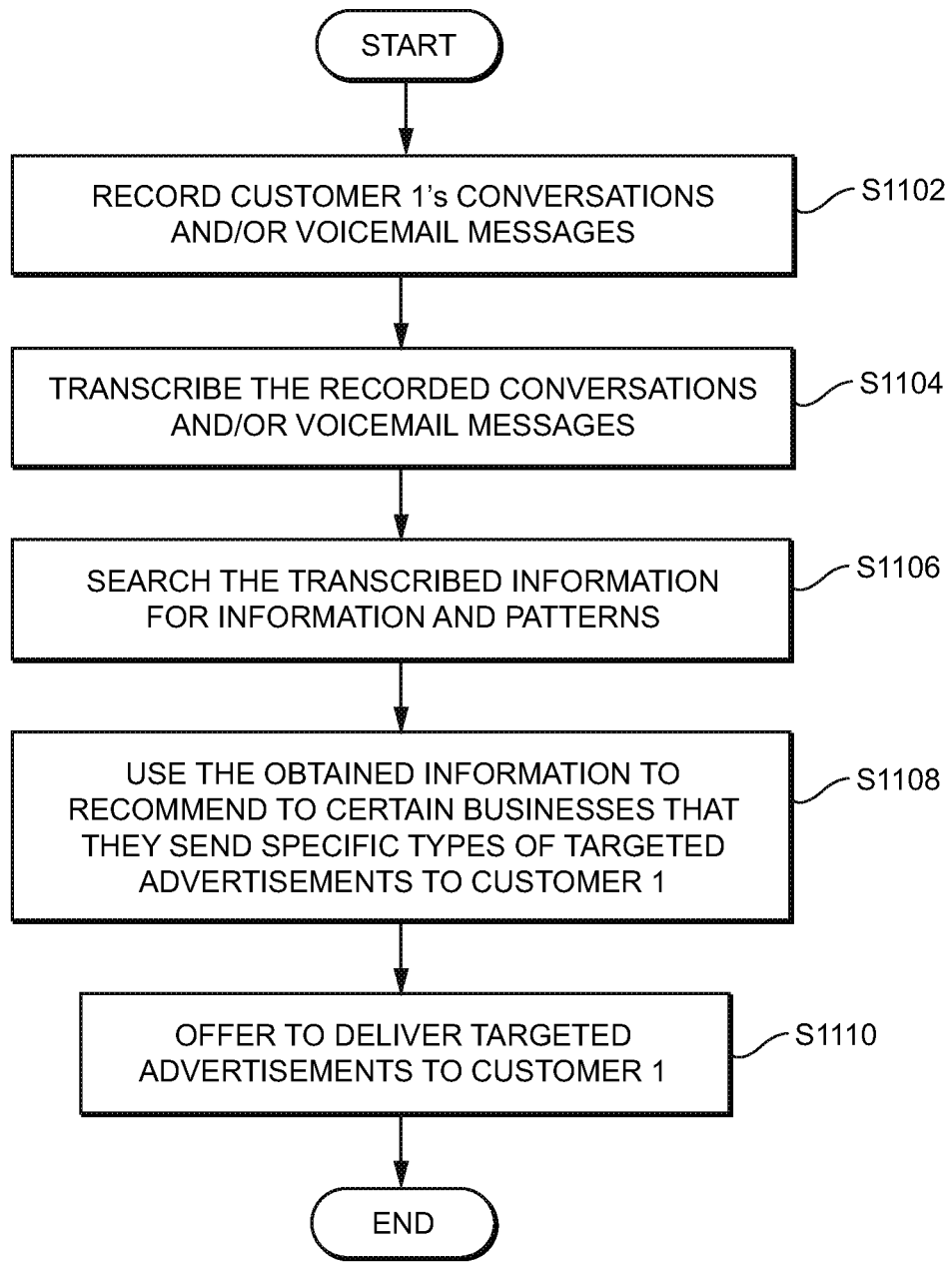
FIG. 11 is a diagram illustrating steps of a second method of determining when to recommend targeted advertising.

FIG. 11 illustrates another method of determining when to recommend that certain businesses send advertisements to a customer. This method begins in step S1102 where a customer's telephone conversations and/or voicemail messages are recorded. Next, in step S1104, the recordings are transcribed. In step S1106, the transcriptions are analyzed for information. Here again, the analysis could take many different forms. But the core idea is to extract information about the customer's habits, spending patterns, behavior and affiliations. And based on this information, in step S1108, the IP telephony system recommends to certain businesses that they send advertisements to the customer.

As in the previous discussion, the method could include step S1110, where the IP telephony system itself delivers an advertizing message to the customer. As explained above, this could be done to protect the privacy of the customer.

In addition to analyzing transcriptions of voicemail or telephone conversations, the IP telephony system might also analyze the text from text messages, emails or other forms of communications that have been generated by a customer or that were directed to or delivered to a customer. Here again, the IP telephony system would be attempting to extract information about the customer's habits, spending patterns, behavior and affiliations.

In the methods discussed above, if recordings of voicemail messages and telephone conversations are being analyzed, and if text messages and email messages are being examined, the customer may have to positively provide permission for these actions to eliminate any privacy considerations.

Figure 12:
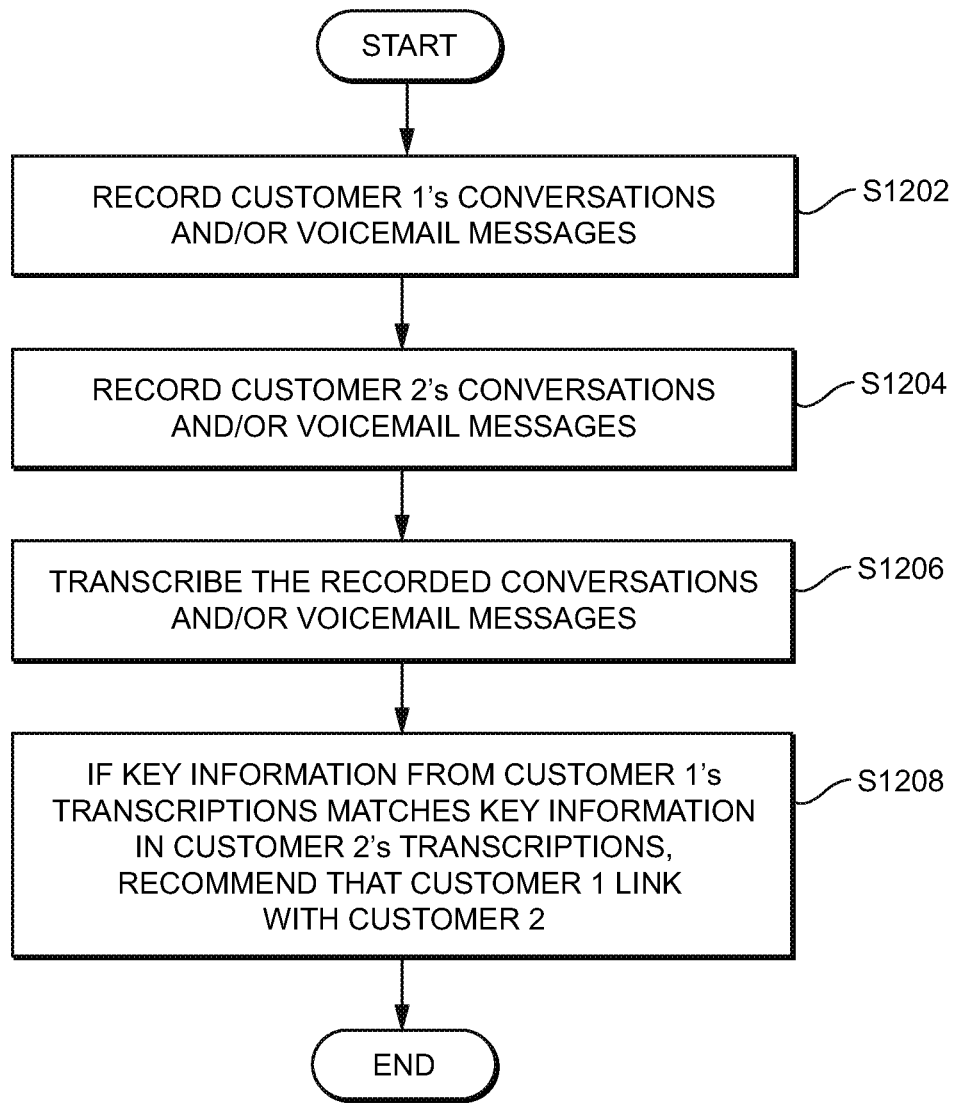
FIG. 12 is a diagram illustrating steps of a sixth method of determining when to recommend that two people establish a link on a social networking system.

FIG. 12 illustrates another method of determining when to recommend that two VOIP customers establish a link on a social networking system. This method also makes use of transcriptions of recorded conversations and voicemail messages and/or text messages e-mail messages and other forms of communications.

In step S1202, customer 1's telephone conversations and voicemail messages are recorded. In step S1204, customer 2's telephone conversations and voicemail messages are recorded. In step S1206, the recordings are transcribed. In step S1208, the transcribed information, and possibly also text messages, e-mail messages and other communications, are examined and analyzed to determine if key information matches.

For example, in step S1208, the analysis of the transcriptions or text from text messages and e-mail messages may be designed to extract names and telephone numbers that were spoken in telephone conversations and voicemail messages or that appeared in the text or e-mail messages. Such information would frequently be spoken in a voicemail message where a caller is leaving contact information so that the called party can return the call. If the analysis of customer 1's and customer 2's recorded conversations, voicemail messages, text and e-mail messages indicate matching information, then the IP telephony system issues a recommendation that customer 1 and customer 2 establish a link on a social networking system.

Figure 13:
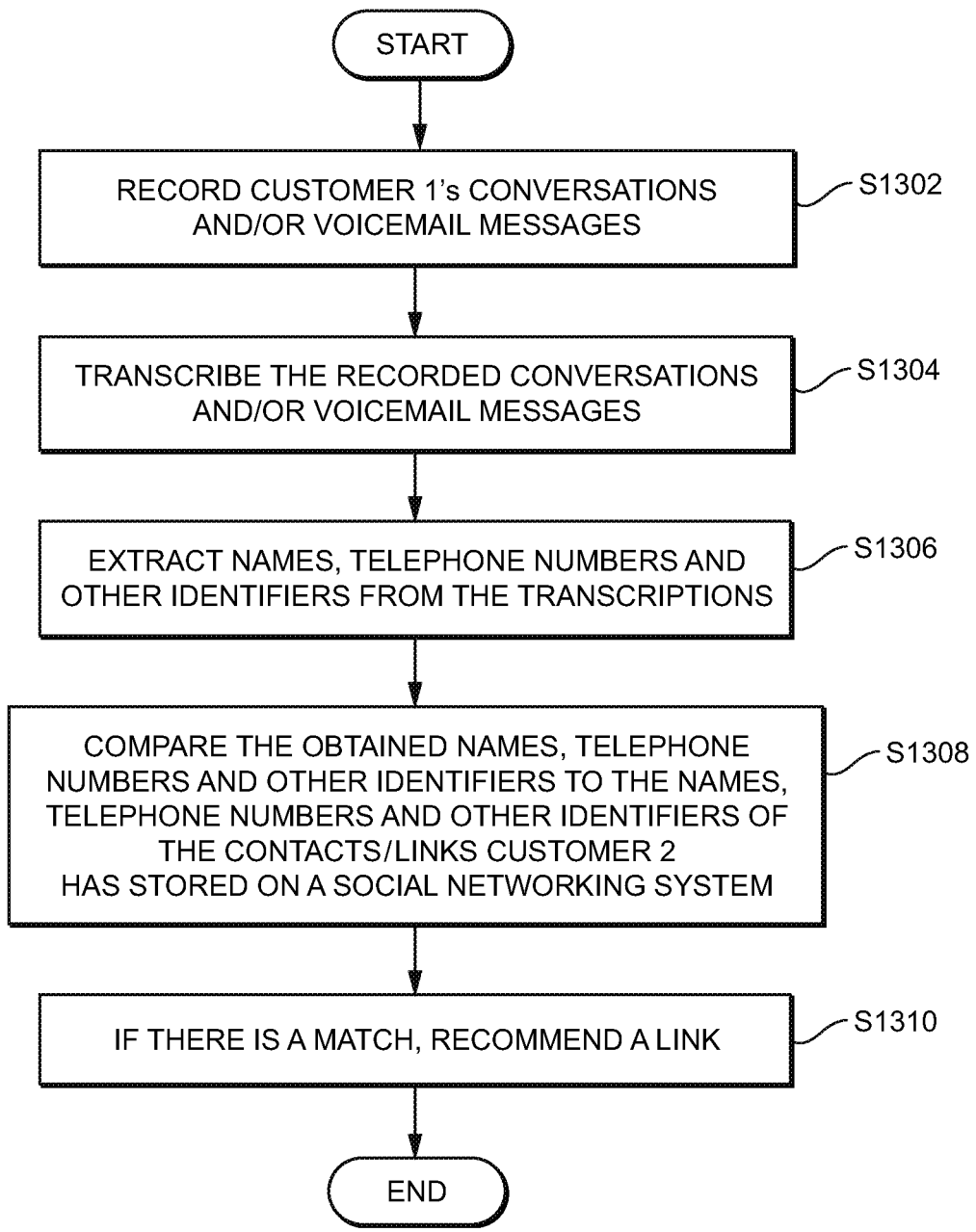
FIG. 13 is a diagram illustrating steps of a seventh method of determining when to recommend that two people establish a link on a social networking system.

FIG. 13 illustrates another method of determining when to recommend that two customers establish a link on a social networking system. In step S1302, the IP telephony system records customer 1's telephone conversations and voicemail messages. In step S1304, the IP telephony system transcribes the recordings. In step S1306, the IP telephony system extracts names, telephone numbers and other identifiers from the transcriptions. Step S1306 may also include extracting names, telephone numbers and other identifying information from text messages and e-mail messages, as described above.

In step S1308, the IP telephony system uses previously obtained credentials to access customer 2's contact or link information on a social networking system. The IP telephony system then compares the names, telephone numbers and other identifiers extracted from the transcriptions of the recordings to the names, telephone numbers and other identifiers appearing in customer 2's contact/link information on the social networking system. If there is a match, in step S1310, the IP telephony system recommends that a link be established between customer 1 and customer 2 on the social networking system.

Figure 14:
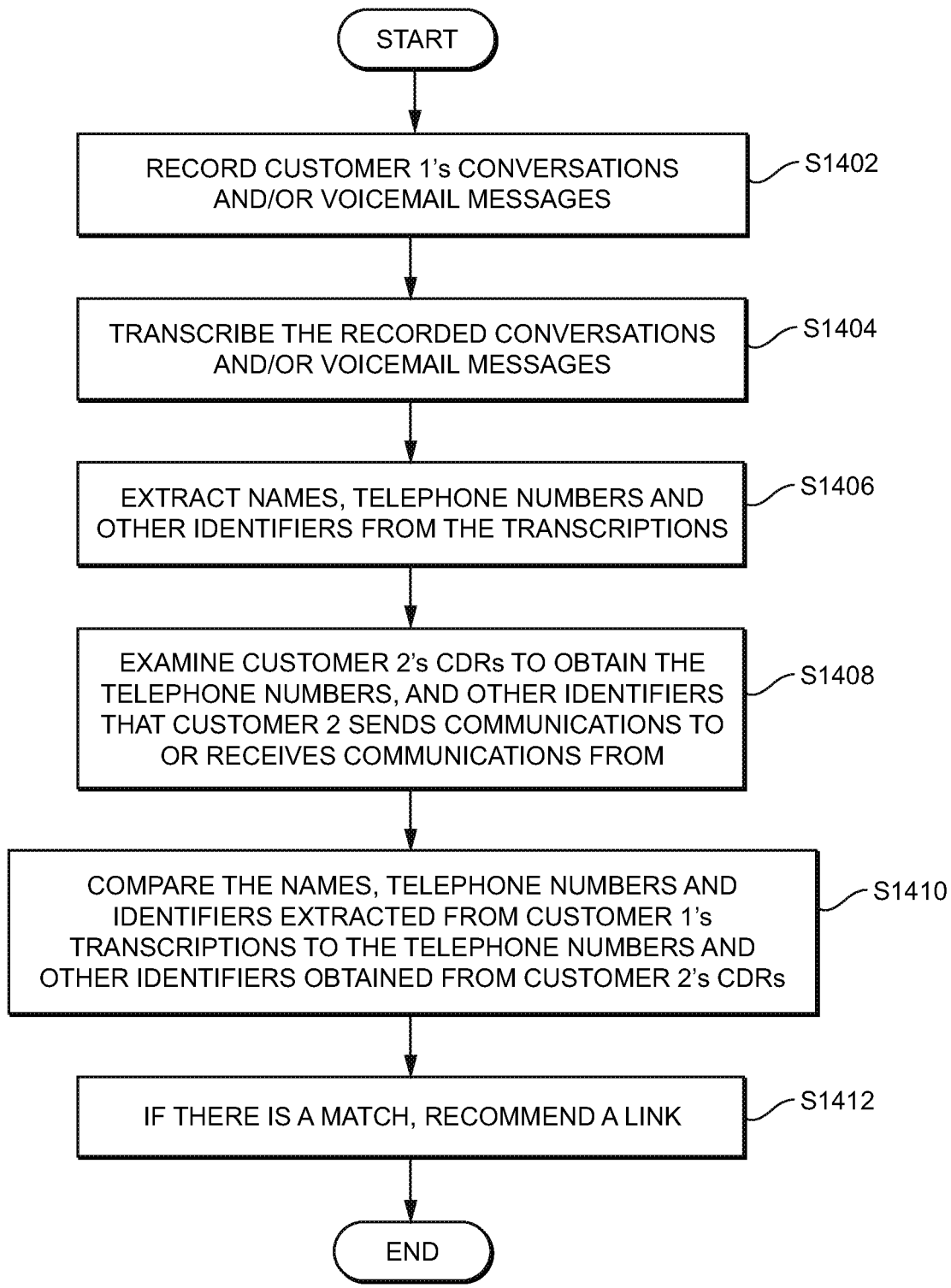
FIG. 14 is a diagram illustrating steps of a eighth method of determining when to recommend that two people establish a link on a social networking system.

Another method of determining when to recommend that two individual establish a link on a social networking system is illustrated in FIG. 14. As shown therein, in step S1402, a first customer's telephone conversations and voicemails are recorded. In step S1404, the recordings are transcribed. In step S1406, the transcriptions are examined, and names, telephone numbers and other identifiers are extracted from the transcriptions. This step may also include extracting names, telephone numbers and other identifiers from text messages, e-mail messages and other communications generated by or sent to the first customer.

In step S1408, a second customer's CDRs are analyzed to extract the telephone numbers and other identifiers to which the second customer has sent communications and from which the second customer has received communications. Once a telephone number or other identifier has been obtained, the IP telephony system may also use this information to obtain the name of an individual or business associated with the telephone number and identifier. Identifying the names of individual and businesses could be accomplished using internal or external databases.

In step 1410, the names, telephone numbers and identifiers extracted from the first customer's communications are compared to the names, telephone numbers and identifiers extracted using the second customer's CDRs. If there are matches, then a recommendation is made to establish a link between the first and second customer.

In many of the methods discussed above, an IP telephony system recommends that two customers establish a link on a social networking system based on information drawn from one or more customers' use of the IP telephony system. In a similar fashion, it is possible to update or add information to customer information and databases stored by an IP telephony system based on the customer's use of the social networking system.

Figure 15:
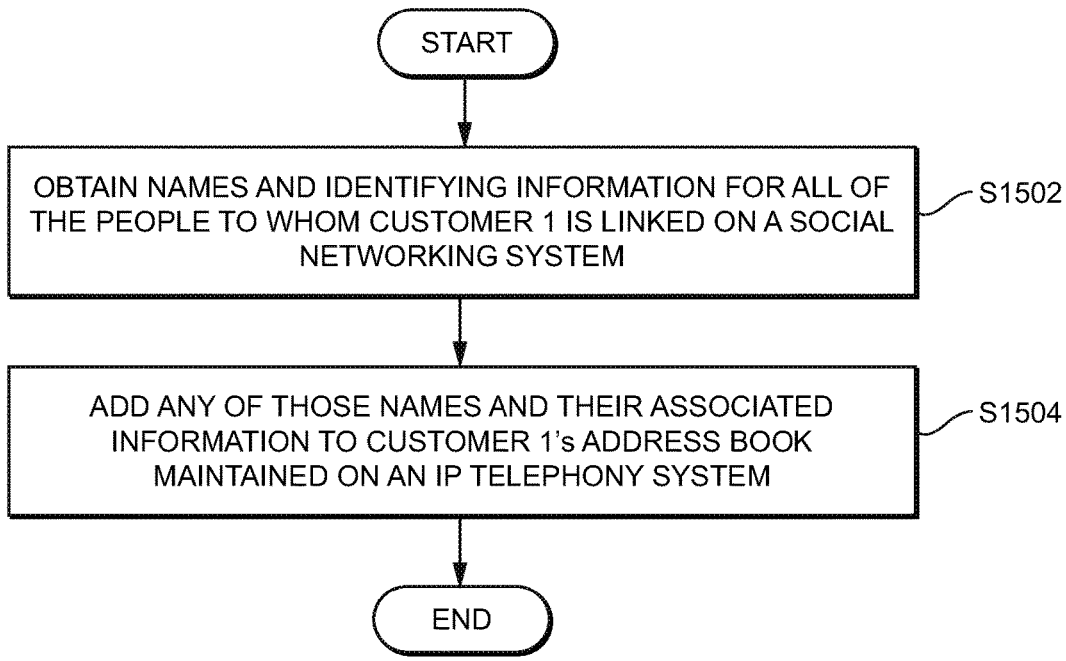
FIG. 15 is a diagram illustrating steps of a method of adding information to an address book maintained for a customer by an IP telephony system

FIG. 15 illustrates a method of adding information to a customer's address book maintained on an IP telephony system based on that customer's use of or information stored on a social networking system. In step S1502, the IP telephony system would utilize a customer's credentials with a social networking system to access the information stored on the social networking system. Specifically, the IP telephony system would identify some or all of the individuals to which the customer is linked on the social networking system. The IP telephony system might also access contact information that the customer has stored on the social networking system.

In step S1504, this information would then be compared to the information stored in an address book maintained by the customer with the IP telephony system. If one or more of the individuals to whom the customer is linked on the social networking system are not already present in the customer's address book, new entries would be created in the address book for those people. Also, even if there is already an entry in the customer's address book for one of the individuals to whom the customer is linked on the social networking system, the IP telephony system may be able to obtain additional information about that person which can then be added to the address book maintained by the IP telephony system. Thus, information stored on the social networking system can be used to add or update information stored by the IP telephony system.

Figure 16:
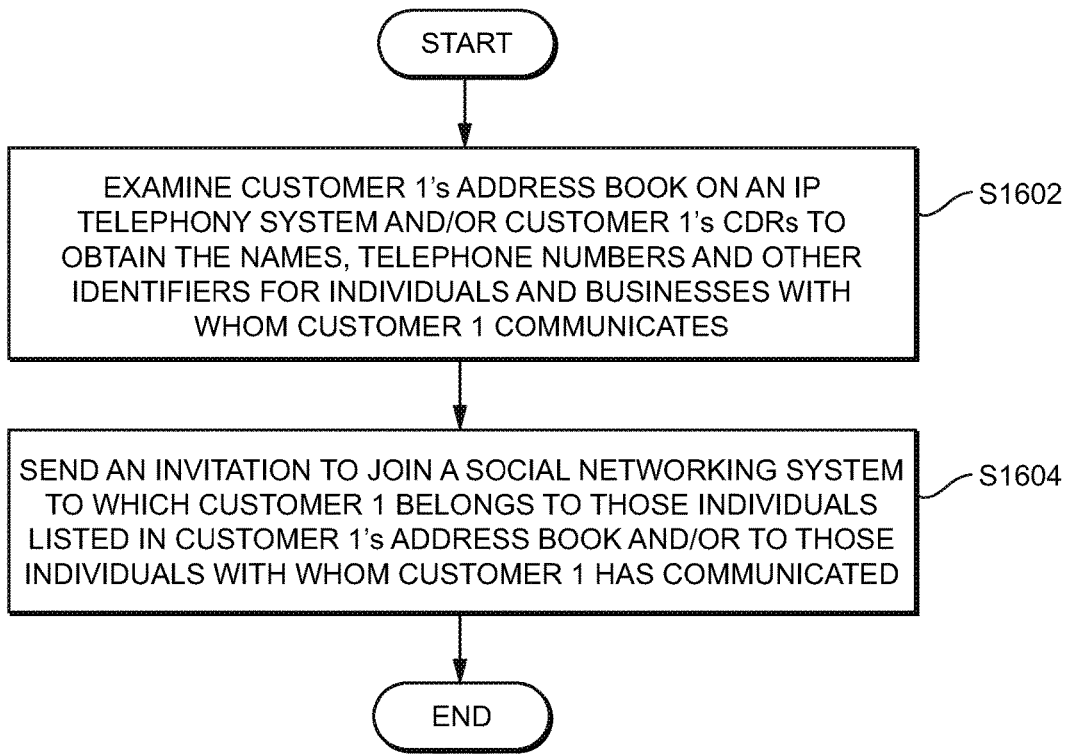
FIG. 16 is a diagram illustrating steps of a first method of determining when to invite a person to join a social networking system.

FIG. 16 illustrates steps of a method of inviting individuals to join a social networking system and to link to a customer of an IP telephony system on that social networking system. In step S1602, information for a customer of an IP telephony system is used to determine the telephone numbers, names or other identifiers of individuals and businesses with whom the customer communicates. This can include obtaining names and addresses from an address book maintained by or for the customer on the IP telephony system. This could also include reviewing CDRs for the customer to obtain the telephone numbers or identifiers that the customer has sent communications to or received communications from. If only a telephone number is available, it may be possible to use internal or external databases to determine a name associated with the telephone number.

In step S1604, invitations are sent to some or all of the individuals or businesses with whom the customer communicates. This could include an invitation to join the social networking system, and also an invitation to establish a link with the customer on the social networking system. In some instances, it may be possible to first check to determine if one of the individuals with whom the customer has been communicating is already a member of the social networking system. If so, the invitation may be limited to an invitation to establish a link with the customer.

Figure 17:
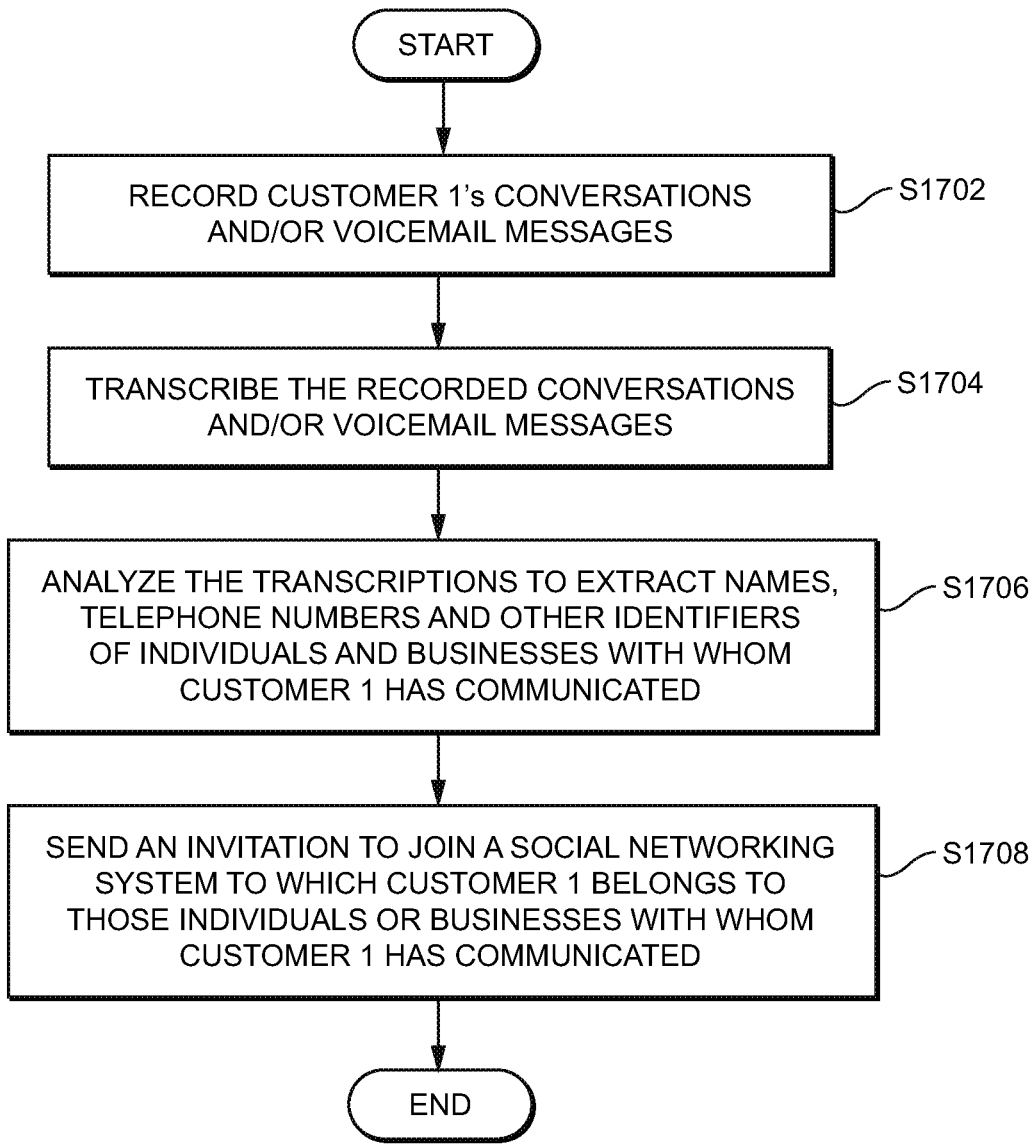
FIG. 17 is a diagram illustrating steps of a second method of determining when to invite a person to join a social networking system.

FIG. 17 illustrates steps of another method of determining when to invite individuals to join a social networking system, and possibly also to link to a customer of an IP telephony system. In step S1702, the customer's telephone conversations and voicemail messages are recorded. In step S1704, transcriptions of those recordings are made. In step S1706, the transcriptions are analyzed to extract names, telephone numbers and other identifiers for the individuals and businesses with whom the customer has been communicating. This step might also include analyzing text messages, e-mail messages and other forms of communications that are generated by or sent to the customer to extract names, telephone numbers and other identifiers.

In step S1708, invitations are sent to some or all of the individuals or businesses with whom the customer has been communicating. This could include an invitation to join the social networking system, and also an invitation to establish a link with the customer on the social networking system. Here again, in some instances it may be possible to first check to determine if one of the individuals with whom the customer has been communicating is already a member of the social networking system. If so, the invitation may be limited to an invitation to establish a link with the customer.

In many of the methods described above, recommendations that two individuals should consider establishing a link on a social networking system or invitations to join a social networking system are issued. Those recommendations and invitations could be sent by either a social networking system or by an IP telephony system, depending on the situation. They could be delivered to the individuals in many different ways. They could be delivered via text messages or e-mail communications. They could be delivered via audio recordings, via live operators, or by having the individuals connect to an interactive voice response system. Any method of issuing and delivering such recommendations and invitations could be used.

While the foregoing description made reference to an IP telephony system, the methods and concepts described above are equally applicable to other types of telephony systems. Thus, references to an IP telephony system should not be considered in any way limiting.

While the technology has been described in connection with what is presently considered to be the most practical and preferred embodiments, it is to be understood that the technology is not to be limited to the disclosed embodiments, but on the contrary, is intended to cover various modifications and equivalent arrangements included within the spirit and scope of the appended claims.

What is claimed is:

1. A computer implemented method of recommending that a first member of a social networking system establish a link with another member of the social networking system, comprising:
reviewing, using at least one processor, a first member's communications activity on a telephony system, to create a list of identifiers associated with the first member's communications activity, wherein the reviewing step comprises at least one of reviewing transcriptions of recordings of the first member's telephone conversations, reviewing transcriptions of voicemail messages that have been created for the first member, reviewing text messages sent to the first member or received by the first member, and reviewing email messages sent to the first member or received by the first member;
determining, with at least one processor, if any individuals or businesses associated with the identifiers on the list created in the reviewing step are members of the social networking system; and
recommending that the first member establish a link on the social networking system with an individual or business associated with an identifier on the list created during the reviewing step if the individual or business is also a member of the social networking system.

2. The method of claim 1, wherein the determining step comprises:
identifying names of individuals or businesses associated with the identifiers on the list created during the reviewing step; and
using the identified names to determine if any of the individuals or businesses associated with the identifiers on the list created during the reviewing step are members of the social networking system.

3. The method of claim 2, wherein the identifying step comprises consulting an identifier cross-reference database to obtain names of individuals and businesses that are associated with the identifiers on the list created during the reviewing step.

4. The method of claim 2, wherein the list of identifiers comprises a list of telephone numbers to which the first member has sent communications and from which the first member has received communications.

5. The method of claim 1, wherein the step of reviewing the first member's communications activity comprises:
transcribing voicemail messages that have been created for the first member; and
creating lists of identifiers appearing in the transcriptions.

6. The method of claim 1, wherein the step of reviewing the first member's communications activity comprises:
transcribing recordings of the first member's telephone conversations; and
creating lists of identifiers appearing in the transcriptions.

7. The method of claim 1, wherein the step of reviewing the first member's communications activity comprises creating a list of identifiers appearing in text messages sent by the first member or received by the first member.

8. The method of claim 1, wherein the step of reviewing the first member's communications activity comprises creating a list of identifiers appearing in e-mail messages sent by the first member or received by the first member.

9. A system for recommending that a first member of a social networking system establish a link with another member of the social networking system, comprising:
means for reviewing a first member's communications activity on a telephony system, and for creating a list of identifiers associated with the first member's communications activity wherein the reviewing means performs at least one of the following functions:
reviews transcriptions of recordings of the first member's telephone conversations,
reviews transcriptions of voicemail messages that have been created for the first member, reviews text messages sent to the first member or received by the first member, and reviews email messages sent to the first member or received by the first member;

means for determining if any individuals or businesses associated with the identifiers on the list created in the reviewing step are members of the social networking system; and means for recommending that the first member establish a link on the social networking system with an individual or business associated with an identifier on the list created during the reviewing step if the individual or business is also a member of the social networking system.

10. A system for recommending that a first member of a social networking system establish a link with another member of the social networking system, comprising:

a reviewing unit that reviews a first member's communications activity on a telephony system and that creates a list of identifiers associated with the first member's communications activity, wherein the reviewing unit performs at least one of the following functions:

reviews transcriptions of recordings of the first member's telephone conversations, reviews transcriptions of voicemail messages that have been created for the first member, reviews text messages sent to the first member or received by the first member, and reviews email messages sent to the first member or received by the first member;

a determining unit that determines if any individuals or businesses associated with the identifiers on the list created by the reviewing unit are members of the social networking system; and a link recommendation unit that recommends that the first member establish a link on the social networking system with an individual or business associated with an identifier on the list created by the reviewing unit if the individual or business is also a member of the social networking system.

11. The system of claim 10, wherein the determining unit identifies names of individuals or businesses associated with the identifiers on the list created by the reviewing unit, and uses the identified names to determine if any of the individuals or businesses associated with the identifiers on the list are members of the social networking system.

12. The system of claim 11, wherein the determining unit consults an identifier cross-reference database to obtain names of individuals and businesses that are associated with the identifiers on the list created by the reviewing unit.

13. The system of claim 11, wherein the list of identifiers comprises a list of telephone numbers to which the first member has sent communications and from which the first member has received communications.

14. The system of claim 10, wherein the reviewing unit transcribes voicemail messages that have been created for the first member and creates lists of identifiers appearing in the transcriptions.

15. The system of claim 10, wherein the reviewing unit transcribes recordings of the first member's telephone conversations and creates lists of identifiers appearing in the transcriptions.

16. The system of claim 10, wherein the reviewing unit creates a list of identifiers appearing in text messages sent by the first member or received by the first member.

17. The system of claim 10, wherein the reviewing unit creates a list of identifiers appearing in e-mail messages sent by the first member or received by the first member.

* * * * *